United States Patent [19]

Kawaguchi et al.

[11] Patent Number: 4,650,774

[45] Date of Patent: Mar. 17, 1987

[54] MAGNETIC HEAD SLIDER MATERIAL

[75] Inventors: Yukio Kawaguchi; Masayasu Yamaguchi, both of Nihonbashi, Japan

[73] Assignee: TDK Corporation, Tokyo, Japan

[21] Appl. No.: 813,560

[22] Filed: Dec. 26, 1985

[30] Foreign Application Priority Data

Dec. 29, 1984 [JP] Japan ................ 59-278810

[51] Int. Cl.[4] ............... C04B 35/10; C04B 35/56
[52] U.S. Cl. ............................................ 501/87
[58] Field of Search ................. 360/122; 501/87

[56] References Cited

U.S. PATENT DOCUMENTS

| | | | |
|---|---|---|---|
| 4,130,847 | 12/1978 | Head et al. | 360/122 |
| 4,251,841 | 2/1981 | Jacobs | 360/122 |
| 4,407,968 | 10/1983 | Lee et al. | 501/87 |
| 4,430,440 | 2/1984 | Wada et al. | 360/122 |
| 4,490,319 | 12/1984 | Lee et al. | 501/87 |
| 4,528,121 | 7/1985 | Matsushita et al. | 501/87 |

FOREIGN PATENT DOCUMENTS

| | | | |
|---|---|---|---|
| 56-140066 | 11/1981 | Japan. | |
| 57-82172 | 5/1982 | Japan | 501/87 |
| 57-135772 | 8/1982 | Japan. | |
| 57-205372 | 12/1982 | Japan | 501/87 |

Primary Examiner—Mark L. Bell
Attorney, Agent, or Firm—Oblon, Fisher, Spivak, McClelland & Maier

[57] ABSTRACT

A sintered body comprising on a weight basis, 100 parts of a mixture of 5–40% of titanium carbide and 95–60% alumina, and 0.01 to 5 parts of at least one oxide selected from the group consisting of gallium, barium, calcium, cerium, niobium, and strontium oxides is an improved material for magnetic head sliders. It is prepared by adding the oxide or carbonate of the specific metal to an alumina-titanium carbide mixture and hot press sintering the combined mixture.

2 Claims, No Drawings

MAGNETIC HEAD SLIDER MATERIAL

BACKGROUND OF THE INVENTION

This invention relates to materials useful as magnetic head sliders.

The most advanced material used to afford a magnetic circuit in a magnetic head for high density recording is a Permalloy thin film having a high permeability. The slider materials generally combined with such magnetic heads are ceramic materials. The slider materials are required to exhibit good CS/S (contact start/stop) properties or wear resistance of the sliding surface of a slider, a dense structure, a high hardness, and improved processability in various steps including cutting, grooving, and mirror finishing. Sintered bodies of alumina-titanium carbide ($Al_2O_3$-TiC) are known to meet such requirements.

For example, Japanese Patent Application Kokai No. 55-163665 discloses a sintered body prepared by hot pressing a mixture of alumina and titanium carbide. This sintered body found a use as a slider element of a floating magnetic head. Another sintered body is disclosed in Japanese Patent Application Kokai No. 56-140066 and it is prepared by adding yttrium in the form of yttrium oxide (or as a component of a solid solution or composite material in some cases) or yttrium carbide (or as a component of a double carbide or composite material in some cases) to alumina and titanium carbide followed by hot isostatic pressing (HIP). A further sintered body is disclosed in Japanese Patent Application Kokai No. 57-135772 and it is prepared by adding $Y_2O_3$ and at least one machinability-improving agent selected from MgO, NiO, $Cr_2O_3$, and $ZrO_2$ to a mixture of $Al_2O_3$, TiC and $TiO_2$, followed by HIP. Also known is a method for obtaining a sintered alumina-titanium carbide body by adding molybdenum (Mo) or tungsten (W) in elemental or carbide form to an alumina-titanium carbide mixture followed by sintering.

The sintered $Al_2O_3$-TiC bodies obtained by these methods, however, suffer from some problems in machinability or processability in that they tend to undergo frequent chipping and grain release at an increased cutting speed and they also tend to release grains during mirror finishing. In order to reduce chipping frequency, an Fe group metal in elemental or oxide form is added to a starting material from which a sintered ceramic body for ceramic tools is made. The resulting sintered bodies cease to be non-magnetic and are thus undesirable for use as magnetic head slider material.

There is the continuing need for the development of a sintered alumina-titanium carbide body free of such problems.

SUMMARY OF THE INVENTION

It is, therefore, an object of the present invention to provide a novel and improved magnetic head slider material having good CS/S properties, a dense structure, a high hardness, non-magnetic nature, and improved processability in various machining steps.

According to the present invention, there is provided a magnetic head slider material comprising 100 parts by weight of a mixture consisting essentially of 5 to 40% by weight of titanium carbide and alumina, and 0.01 to 5 parts by weight of at least one oxide selected from the group consisting of gallium (Ga), barium (Ba), calcium (Ca), cerium (Ce), niobium (Nb), and strontium (Sr) oxides.

The magnetic head slider material of the present invention is prepared by a process comprising the steps of adding from 0.01 to 5 parts by weight calculated as oxide of at least one member selected from the groups consisting of the oxides and the carbonates of gallium (Ga), barium (Ba), calcium (Ca), cerium (Ce), niobium (Nb), and strontium (Sr) to 100 parts by weight of a mixture consisting essentially of 5 to 40% by weight of titanium carbide and alumina, and sintering the combined mixture.

DETAILED DESCRIPTION OF THE INVENTION

The magnetic head slider material of the present invention comprises a sintered body of alumina or aluminum oxide and titanium carbide.

The sintered alumina-titanium carbide body comprises a mixture of alumina ($Al_2O_3$) powder and titanium carbide (TiC) powder combined with at least one member selected from the oxides of gallium (Ga), barium (Ba), calcium (Ca), cerium (Ce), niobium (Nb) and strontium (Sr).

The sintered alumina-titanium carbide body is generally prepared by adding at least one member in powder form selected from the oxides of gallium, barium, calcium, cerium, niobium, and strontium such as GaO, $CeO_2$, $Nb_2O_5$, etc. and the carbonates of these metals such as $BaCO_3$, $CaCO_3$, $SrCO_3$, etc. to a mixture of alumina ($Al_2O_3$) and titanium carbide (TiC) powders and sintering the combined mixture. When the carbonate is added to the starting mixture, it is converted into oxide by sintering.

The aluminum oxide ($Al_2O_3$) powder may preferably be pulverlized to an average particle size of 0.1 to 1 $\mu$m, and more preferably from 0.4 to 0.6 $\mu$m.

The titanium carbide (TiC) powder may preferably be pulverlized to an average particle size of 0.1 to 3 $\mu$m, and more preferably from 0.5 to 1.5 $\mu$m.

Aluminum oxide and titanium carbide may be combined to form a mixture wherein the content of aluminum oxide ranges from 60 to 95% by weight and the remaining 40 to 5% by weight is titanium carbide. Titanium carbide contents of less than 5% are too low to achieve the additive effect and allow aluminum oxide to grow its grains. The processability of such a mixture suddenly diminishes as its titanium carbide content exceeds 40% by weight.

The oxides and carbonates of gallium, barium, calcium, cerium, niobium, and strontium which are added to the alumina-titanium carbide mixtures are preferably powders having an average particle size of 0.1 to 3 $\mu$m, and more preferably 0.5 to 1 $\mu$m.

These oxides and carbonates are added in an amount of 0.01 to 5 parts by weight, preferably 1 to 3 parts by weight calculated as oxide per 100 parts by weight of the alumina-titanium carbide mixture. No significant additive effect is attained with amounts of less than 0.01 parts by weight. The localization of the additive in the resulting sintered body sharply increases when the amount of the additive exceeds 5 parts by weight.

Sintered alumina-titanium carbide bodies may generally be prepared by adding a powder oxide or carbonate of Ga, Ba, Ca, Ce, Nb or Sr to a mixture of $Al_2O_3$ and TiC powders, mixing the powders to provide a substantially uniform mixture, shaping the mixture into a compact, sintering the compact in a non-oxidizing atmosphere by a hot press sintering process, and allowing the sintered compact to cool.

The sintering temperature preferably ranges from 1500° to 1800° C., and more preferably from 1650° to 1750° C. Temperatures lower than 1500° C. fail to produce a sufficiently dense sintered body whereas higher temperatures in excess of 1800° C. undesirably enhance sublimation of the additive resulting in a sintered body having a surface layer of different structure from its interior.

The pressing pressure is in the order of 200 to 300 kg/cm$^2$.

The non-oxidizing atmosphere may be comprised of an inert gas such as nitrogen ($N_2$), argon (Ar), and helium (He), hydrogen ($H_2$), carbon monoxide (CO), various hydrocarbons, and mixtures thereof, and vacuum. The non-oxidizing atmosphere is required in order to prevent oxidation of TiC.

The sintering time varies with the sintering temperature and generally ranges from about 1 to 3 hours.

The sintering process may involve preliminary sintering of a green compact of the starting powder mixture in a nonoxidizing atmosphere (preferably in vacuum up to 1200° C. and then in argon atmosphere, for example) followed by hot isostatic pressing (HIP) wherein the pre-sintered compact is sintered in an HIP furnace. The preliminary sintering may preferably effected at a temperature of about 1400° to 1650° C. for a time of about 1 to 3 hours. The hot isostatic pressing may preferably be effected at a temperature of about 1300° to 1500° C. and a pressure of about 1000 to 1500 kg/cm$^2$ for a sintering time of about 1 to 5 hours in an inert atmosphere of argon or the like. More specifically, the inert atmosphere of argon or similar inert gas is pressurized to 300 to 400 kg/cm$^2$ at room temperature and then further pressurized by heating as recited above.

The additives whether they are the oxides or carbonates of gallium, barium, calcium, cerium, niobium, and strontium are almost left as oxides at the end of sintering. If the additives are left in metallic form at the end of sintering, the resulting body is undesirable because of poor bond of such metal element leading to grain release. X-ray analysis of the sintered bodies prepared according to the present invention have confirmed that the additives are not left in metallic form.

During sintering, part of titanium carbide (TiC) may be converted into titanium dioxide ($TiO_2$).

The thus obtained sintered alumina-titanium carbide bodies are advantageous in that their strength can be reduced from 95 kg/mm$^2$, which is typical of usual sintered alumina-titanium carbide bodies, to 70 to 80 kg/mm$^2$ while maintaining their Vickers hardness at a high level. This means an approximately two-fold improvement in cutting machinability. Grain release is unlikely to occur during mirror finishing.

The sintered aluminum oxide-titanium carbide bodies intended for magnetic head slider material as described above may be applied not only to substrates or sliders of so-called floating type magnetic heads, but also to sliders of floppy heads as well as various dammy blocks.

Examples of the present invention are given below by way of illustration and not by way of limitation.

EXAMPLE

Aluminum oxide ($Al_2O_3$, purity 99.9%) having an average particle size of 0.5 μm was mixed with titanium carbide (TiC, purity 99%, carbon content 19% or higher, with up to 1% of the carbon content being comprised of free graphite) having an average particle size of 0.7 μm in a weight ratio of 7:3. To 100 parts by weight of the aluminum oxide-titanium carbide mixture were added various additives in various proportions as shown in Table 1. Each mixture was subjected to wet milling for 20 hours in a ball mill using a suitable liquid milling medium.

The milled slurry was dried into dry particles which were shaped into a compact in a graphite mold having an inner diameter of 77 mm. The compact was subjected to hot press sintering in a vacuum atmosphere at a sintering temperature of 1500° to 1800° C. and a pressure of 200 to 300 kg/cm$^2$ for 1 hour.

After cooling, each sintered body was removed from the mold and machined by means of a #200 diamond grinding wheel into a specimen of 3 inches diameter and 4 mm thick.

Specimen Nos. 101–110 were prepared using the additives according to the present invention, specimen Nos 201–209 prepared using conventional additives, and specimen No. 301 prepared without an additive. They were determined for various properties with the results shown in Table 1.

Evaluation of the properties is shown below.

Mirror finishing

A specimen was lapped with a green carbide (GC) abrasive and then polished with a diamond abrasive. It was determined for grain release by secondary electron image diffraction and a surface roughness meter.

Using an X-ray microanalyzer, an X-ray image of the specimen surface was obtained to analyze the composition of a grain released site.

Magnetism

Using a vibrating sample type magnetometer (VSM), a specimen was determined whether or not it was magnetic.

Machinability (a) Cutting (Constant-pressure cutting test)

A specimen of 30 mm wide and 4 mm thick was bonded to a glass plate bonded onto a single-direction thrust bearing. While being pulled with weights of 500 and 1000 grams, the specimen was cut by means of a diamond cutting tool to determine the cutting speed.

(b) Chipping frequency (constant-speed cutting test)

A specimen of 30 mm wide and 4 mm thick was cut by means of a diamond cutting tool at a constant feed of 25 mm/min. The frequency of chipping at a depth of 10 μm or more from the cut surface was determined under a microscope of 200X magnification (chipping frequency per linnear 30 mm). Evaluation criterion is as follows.

| Sample | Chippings |
| --- | --- |
| O | less than 5 |
| Δ | 5–10 |
| X | more than 10 |

CS/S property (Wear resistance)

Thin film elements were similarly prepared from the respective specimens and processed into slider form. Each magnetic head was subjected to 20,000 contact start/stop cycles. The extent of wear expressed in micrometer was determined.

| Specimen No. | Additive Type | Amount (parts) | Mirror finishing** | Magnetism | Cutting rate (mm/min) | Chipping frequency | CS/S ($\mu$m/20000 cycles) |
|---|---|---|---|---|---|---|---|
| 101 | GaO | 2 | non | non | 22 | O | <0.5 |
| 102 | $BaCO_3$ | 2 | non | non | 30 | O | <0.5 |
| 103 | $CaCO_3$ | 2 | non | non | 25 | O | <0.5 |
| 104 | $SrCO_3$ | 2 | non | non | 20 | O | <0.5 |
| 105 | $CeO_2$ | 2 | non | non | 20 | O | <0.5 |
| 106 | $Nb_2O_5$ | 2 | non | non | 20 | O | <0.5 |
| 107 | $BaCO_3 + CeO_2$ | 2.0 + 0.5 | non | non | 40 | O | <0.5 |
| 108 | $BaCO_3 + Nb_2O_5$ | 2.0 + 0.5 | non | non | 36 | O | <0.5 |
| 109 | $BaCO_3$ | 3 | non | non | 35 | O | <0.5 |
| 110 | $BaCO_3$ | 1 | non | non | 27 | O | <0.5 |
| 201* | MgO | 1 | D | non | 10 | Δ | 1.8 |
| 202* | $Y_2O_3$ | 1 | D | non | 15 | Δ | 1.5 |
| 203* | $Fe_2O_3$ | 1 | D (Fe) | magnetic | 20 | O | 1.2 |
| 204* | CoO | 1 | D (Co) | magnetic | 20 | O | 1.5 |
| 205* | NiO | 1 | D (Ni) | magnetic | 20 | O | 1.5 |
| 206* | $ZrO_2$ | 1 | D | non | 14 | Δ | 1.2 |
| 207* | $Cr_2O_3$ | 1 | D | non | 14 | Δ | 1.5 |
| 208* | Mo | 1 | D (Mo) | non | 14 | O | 1.8 |
| 209* | W | 1 | D (W) | non | 14 | O | 1.8 |
| 301* | — | — | D | non | 8 | X | 1.8 |

*comparative examples
**D means that grain release is detected.
Localized metal is given in parenthesis.

We claim:

1. A magnetic head slider material consisting essentially of
   100 parts by weight of a mixture consisting essentially of 5 to 40% by weight of titanium carbide and alumina, and
   0.01 to 5 parts by weight of at least one oxide selected from the group consisting of gallium, barium, cerium and niobium oxides.

2. A magnetic head slider material prepared by a process comprising the steps of
   adding from 0.01 to 5 parts by weight calculated as oxide of at least one member selected from the group consisting of the oxides and the carbonates of gallium, barium, cerium and niobium, to 100 parts by weight of a mixture consisting essentially of 5 to 40% by weight of titanium carbide and alumina, and
   sintering the combined mixture.